Sept. 1, 1925.
E. R. HUNTLEY
1,551,957
ODOMETER RESETTING MECHANISM
Filed Jan. 2, 1919 5 Sheets-Sheet 1
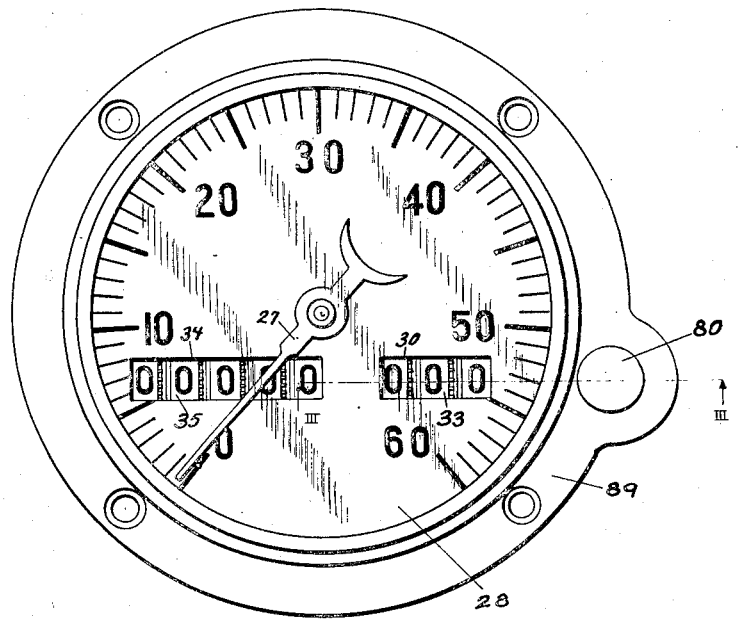
Fig. I.
Fig. II.
INVENTOR.
Ernest R. Huntley.
BY Chester W Braselton
ATTORNEYS.

Sept. 1, 1925.  
E. R. HUNTLEY  
1,551,957  
ODOMETER RESETTING MECHANISM  
Filed Jan. 2, 1919 5 Sheets-Sheet 2
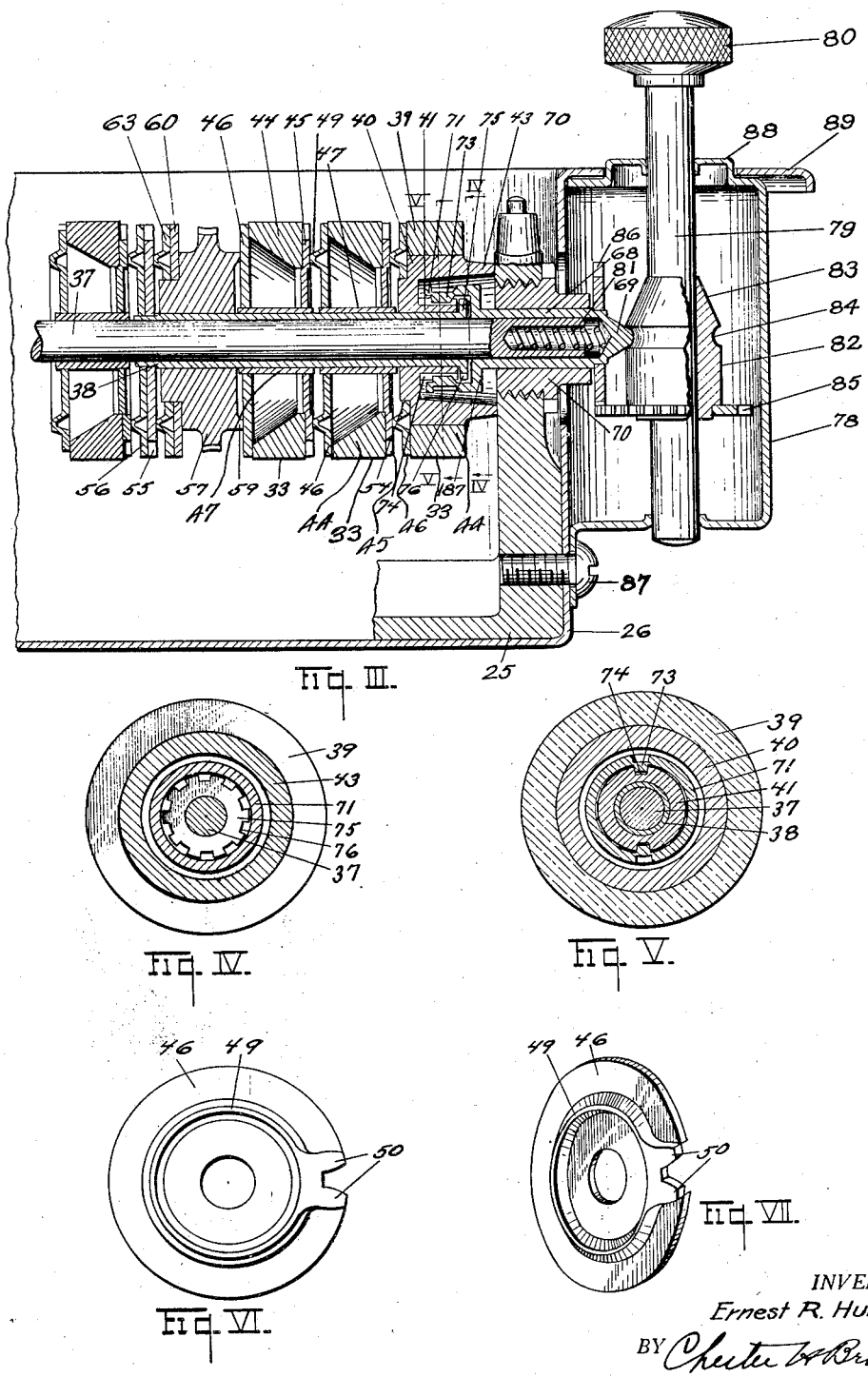
INVENTOR.  
Ernest R. Huntley.  
BY Chester H Braselton  
ATTORNEYS.

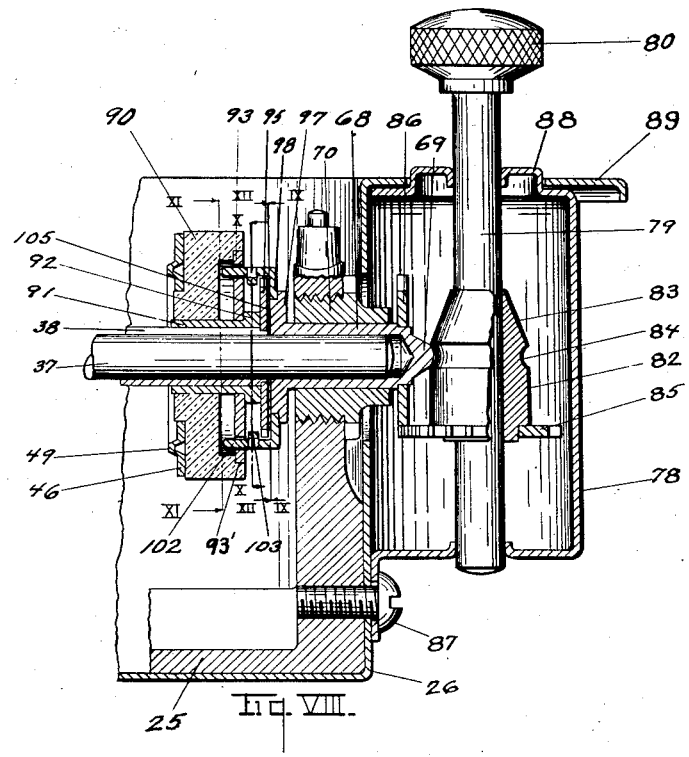
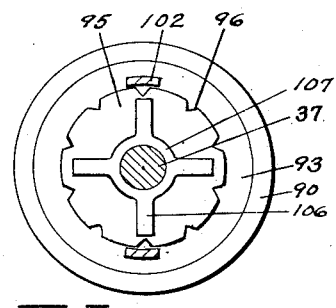
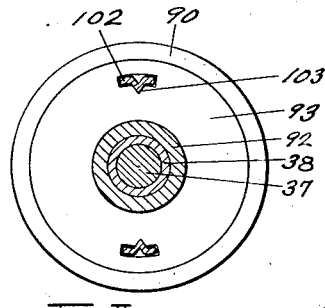
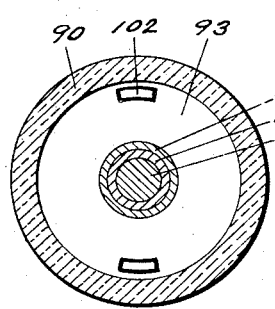
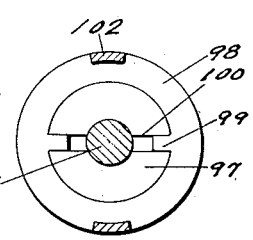
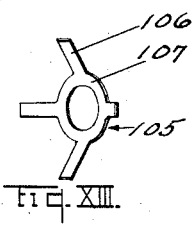

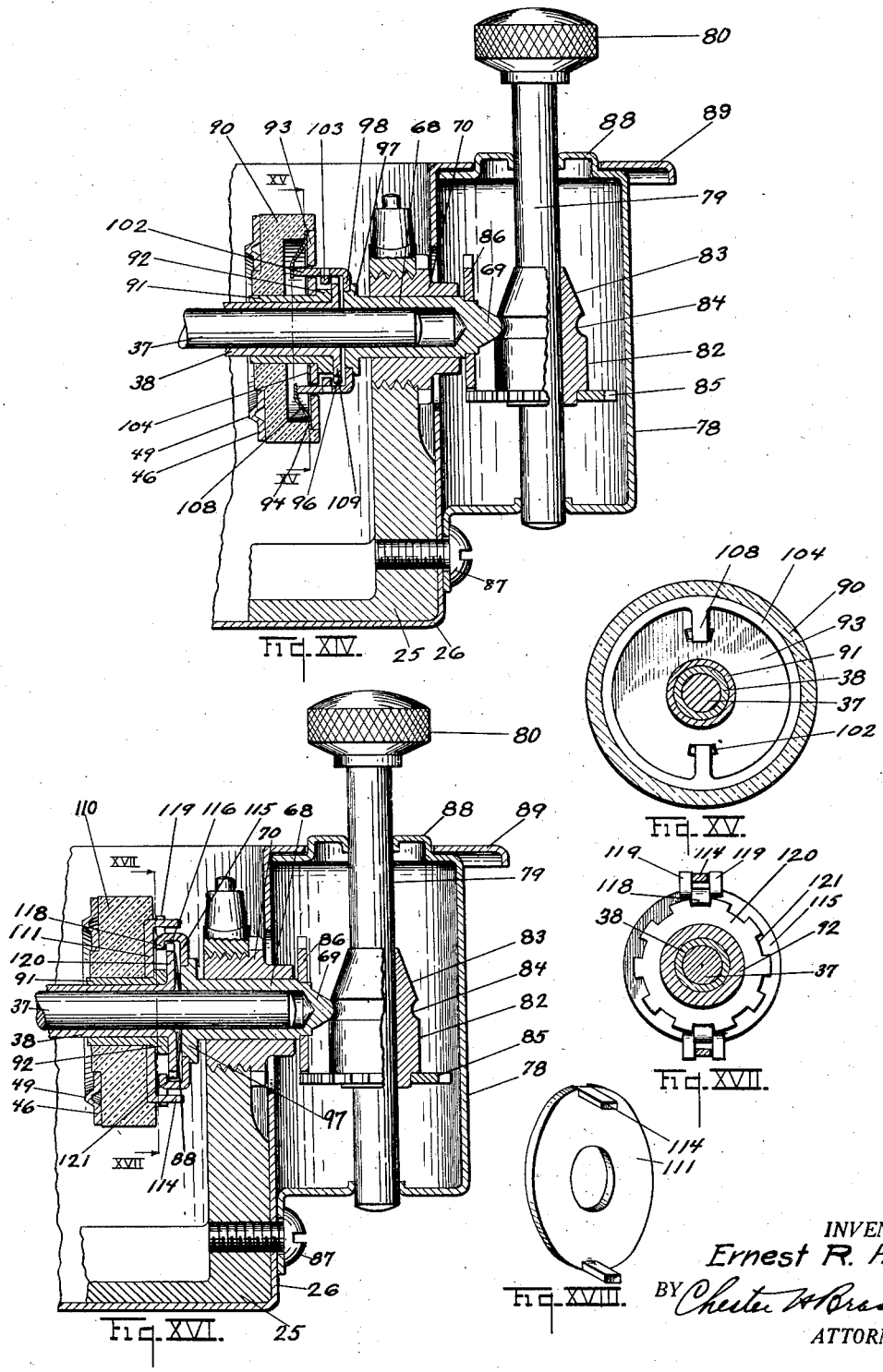

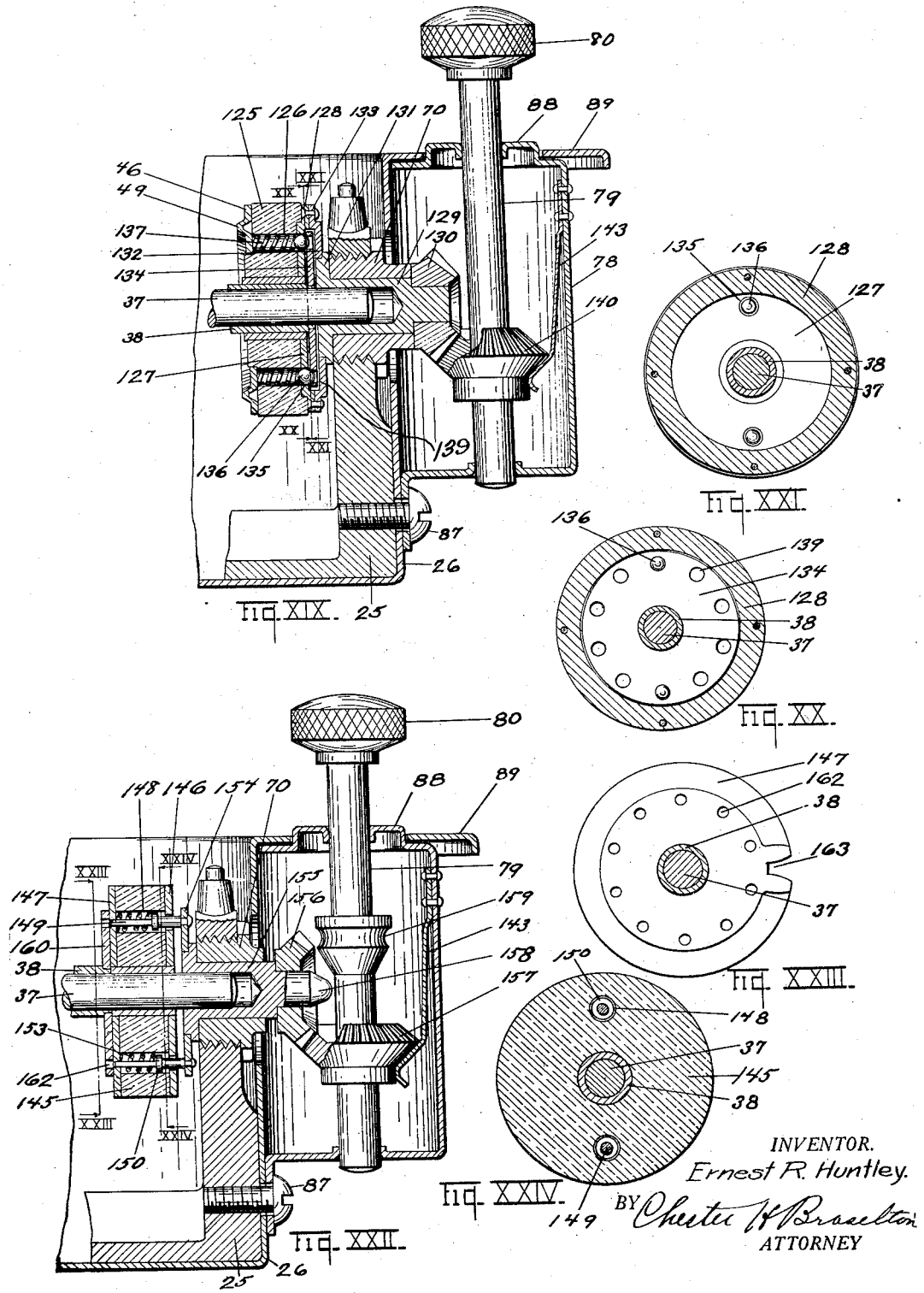

Patented Sept. 1, 1925.

1,551,957

UNITED STATES PATENT OFFICE.

ERNEST R. HUNTLEY, OF TOLEDO, OHIO, ASSIGNOR, BY MESNE ASSIGNMENTS, TO INDUSTRIAL RESEARCH CORPORATION, OF TOLEDO, OHIO, A CORPORATION OF DELAWARE.

ODOMETER-RESETTING MECHANISM.

Application filed January 2, 1919. Serial No. 269,337.

*To all whom it may concern:*

Be it known that I, ERNEST R. HUNTLEY, residing at Toledo, county of Lucas, State of Ohio, have invented certain new and useful Improvements in Odometer-Resetting Mechanism, of which I declare the following to be a full, clear, and exact description.

This invention relates to speedometers and more particularly to improved means for resetting the odometer mechanism to zero.

The principal object of this invention is to provide an improved resetting mechanism for the odometer which is effective in operation, cheap in construction, and readily assembled.

A further object of the invention is the provision of improved means for disconnecting the actuating mechanism from the odometer wheels and simultaneously connecting the registering wheels with the resetting mechanism.

Another object of the invention is to provide a simple, cheap and efficient wheel, attached to each registering unit, the wheel being adapted to co-operate with the corresponding transfer pinion during transferring and resetting operations.

With these and incidental objects in view the invention consists in certain novel features of invention and combination of parts, the essential features of which are set forth in appended claims and preferred and modified forms of which are hereinafter described with reference to the drawings which accompany and form part of this specification.

Of the drawings:

Fig. I is a front view of a speedometer for vehicles and the like embodying my invention.

Fig. II is a cross-sectional view taken through the speedometer and showing the odometer mechanism in side elevation.

Fig. III is a detail section, taken substantially on the line III—III of Fig. I.

Fig. IV is a detail, cross-sectional view, taken substantially on the line IV—IV of Fig. III.

Fig. V is a detail, cross-sectional view, taken substantially on the line V—V of Fig. III.

Fig. VI is a detail side view of one of the transfer wheels secured to the sides of the registering wheels.

Fig. VII is a detail, perspective view of the transfer wheel shown in Fig. VI.

Fig. VIII is a sectional view, similar to Fig. III, and shows a modification of the resetting mechanisms.

Fig. IX is a detail, cross-sectional view, taken substantially on the line IX—IX of Fig. VIII.

Fig. X is a detail, cross-sectional view, taken substantially on the line X—X of Fig. VIII.

Fig. XI is a detail, cross-sectional view, taken substantially on the line XI—XI of Fig. VIII.

Fig. XII is a detail, cross-sectional view, taken substantially on the line XII—XII of Fig. VIII.

Fig. XIII is a detail, perspective view of the spring means for returning part of the mechanism to normal position when the resetting shaft is lowered to normal position.

Fig. XIV is a sectional view similar to Fig. VIII and shows another modified form of resetting mechanism.

Fig. XV is a detail, cross-sectional view, taken substantially on the line XV—XV of Fig. XIV.

Fig. XVI is a sectional view showing another modified form of the invention.

Fig. XVII is a detail, cross-sectional view, taken substantially on the line XVII—XVII of Fig. XVI.

Fig. XVIII is a detail, perspective view of the disc connected to the right hand side of the units wheel of the trip register.

Fig. XIX is a sectional view, showing still another modified form of the invention.

Fig. XX is a detail, cross-sectional view, taken substantially on the line XX—XX of Fig. XIX.

Fig. XXI is a detail, cross-sectional view, taken substantially on the line XXI—XXI of Fig. XIX.

Fig. XXII is a sectional view of another modification of the invention.

Fig. XXIII is a detail, cross-sectional view, taken substantially on the line XXIII—XXIII of Fig. XXII.

Fig. XXIV is a detail, cross-sectional view, taken substantially on the line XXIV—XXIV of Fig. XXII.

Referring to Figs. I and II of the drawing, the speed indicating mechanism and the odometer mechanism are mounted in a frame 25 positioned in the casing 26 as fully shown and described in copending application, Serial No. 269,339, filed Jan. 2, 1919. The indicating hand 27 is moved over a dial 28 mounted on the frame 25 to indicate the speed of the vehicle and the dial 28 is provided with a sight opening 30 through which the numerals on the wheels 33 of the trip register may be viewed, and is also provided with a sight opening 34 through which the numerals on the wheels 35 of the total register may be viewed. A glass 36 or other transparent front is provided for the casing. The trip register is adapted to be reset when desired while the total register cannot be reset as is usual in odometers of this type.

Mounted in the frame 25 is a rod 37 (Fig. III) on which is mounted a sleeve 38 free to rotate about the rod. Loose on the rod 37 are the numeral wheels 35 of the total register, and the numeral wheels 33 of the trip register are loosely mounted on the sleeve 38. The units numeral wheel of the trip register comprises a ring 39 having the numerals on its outer periphery and mounted on a member 40, loosely mounted on the sleeve 38. The member 40 is partially hollow thereby forming a central sleeve portion 41 and an outer annular portion 43, which projects to the right of the wheel and engages the frame 25. The tens and hundreds numeral wheels of the trip register and each of the numeral wheels of the total register comprises a ring 44 having a gear 45 secured to its right side and a toothed disc 46 secured to its left side. The units numeral wheel 46 of the trip register is advanced one step each tenth of a mile traveled so that it registers tenths of a mile while the tens and hundreds wheels of the trip register and all of the numeral wheels of the total register indicate miles, as is usual in odometers of this type. The gear 45 and disc 46 of each wheel except the units wheel are fast on a corresponding sleeve 47, loosely mounted on the sleeve 38. The disc 46 of highest denomination of the trip register and of the total register is a plane one. The discs 46 on the wheels of lower orders are made of sheet metal and they are stamped by dies to form an annular rib 49, (Figs. VI and VII) and two teeth 50 projecting from the rib. The rib 49 of each disc 46 engages the side of the gear 45 of the numeral wheel of next higher order to space properly the numeral wheels on the rod 37 and sleeve 38. The disc 46 on the units numeral wheel of the trip register has an enlarged central opening, the edge of which engages an annular shoulder 54 on the member 40. Fast on the left hand end of the sleeve 38 is a gear 55, similar to the gears 45 and the gear 55 is connected to a disc 56, which is similar to the discs 46. Loosely mounted on the sleeve 38 and between the gear 55 and the hundreds wheel of the trip register is a worm gear 57, which meshes with a worm gear (not shown) on a shaft 58 (Fig. II) actuated through suitable mechanism by one of the moving parts of the vehicle. At its right hand side, the gear 57 has an annular rib 59 engaging the disc 46 of the hundreds numeral wheel of the trip register. Secured to the left hand side of the gear 57 and on an annular shoulder of the gear is a plain disc 60 to which is secured a disc 63 similar to the discs 46 and the disc 56, the annular rib on the disc 63 engaging the gear 55.

Loosely mounted on a rod 65 (Fig. II) are the usual transfer pinions 66 meshing with the corresponding toothed discs 46 and gears 45 to effect transfers from one numeral wheel to the numeral wheel of the next higher order when the wheel of lower order is actuated from its 9 to its 0 positions, as is well understood in the art. The units numeral wheel of the trip register being held on the sleeve 38 to which the gear 55 is secured, is actuated by the actuating gear 57 through the disc 63, the gear 55 and the corresponding transfer pinion 66, the units wheel being advanced one step upon each tenth of a mile traveled. The units wheel of the total register is advanced one step upon each mile traveled, through the disc 56, its gear 55 and the corresponding transfer pinion.

The right hand end of the shaft or rod 37 is supported in a sleeve 68, which in turn is slidably supported in a ring 70 having external threads co-operating with internal threads in an opening in the frame 25, whereby the ring 70 is screwed and held in position in the frame. The right hand end of the sleeve 68 is closed and forms a conical projection 69. The left hand end of the sleeve 68 is enlarged, so that it extends around the sleeve portion 41 of the member 40 of the unit numeral wheel of the trip register. As shown in Figs. III and V the enlarged portion 71 of the sleeve 68 has diametrically opposite, inwardly extending teeth 73, which are preferably formed by stamping them out by dies. The teeth 73 project into diametrically opposite grooves 74 formed in the sleeve portion 41 of the member 40 so that the unit registering wheel is rotated with the sleeve 68 while the sleeve may be moved axially independently of the units numeral wheel. The right hand end of the sleeve 38 is provided with a radial flange 75 in which are cut notches 76 forming teeth as shown in Fig. IV. Adjacent to the right hand end of the rod 37 is a casing 78 secured at its lower end to the main casing 26 by a screw 87. The upper end of the casing 78 has a cup shaped extension 88 which extends through an opening in flange 89 of the main casing to hold the upper end of the casing 78 in place. A shaft 79 (Fig. III) having a knurled turn button 80 on its upper end is mounted in the casing 78 for vertical sliding movement. Secured to the shaft 79 is a collar 82 having a conical portion 83 terminating at its lower end into a circumferential groove 84. Secured to the lower end of the collar 82 is a gear 85 adapted to mesh with a gear 86 fast on the sleeve 68.

The right hand end of the rod 37 is hollow and a coiled spring 81 is mounted in its hollow portion and compressed between the rod and the closed end of the sleeve 68.

Normally the shaft 79 is in lowered position, the collar then resting near the bottom of the casing 78 and the gears 85 and 86 being out of engagement. In this position of the shaft 79 the spring 81 retains the sleeve 68 in its right hand position in which a shoulder 187 formed by the enlarged portion 71 engages the side of the frame 25 and the teeth 73 on the enlarged portion 71 of the sleeve 68 extend into the grooves 74 in the sleeve portion 41 and into the notches 76 in the flange 75 of the sleeve 38, thereby coupling the units numeral wheel of the trip register and the sleeve 38 together. When the sleeve 68 is in this position, it can be seen that the movement of the actuating gear 57 is transmitted to the units numeral wheel through disc 63, transfer pinion 66, gear 55 and the sleeves 38 and 68. When the trip register is to be reset to zero, the shaft 79 is raised to the position shown in Fig. III, and during the elevation of the shaft, the conical portion 83 of the collar 82 co-operates with the conical end 69 of the sleeve 68 to move the sleeve towards the left so that the teeth 73 on the sleeve 68 are moved out of the notches 76 on the flange 75 to permit the turning of the units numeral wheel independently of the sleeve 38 and the actuating mechanism for operating the sleeve 38. During the last increment of upward movement of the shaft 79 the end of the sleeve 68 is moved a slight distance by the spring 81 into engagement with the groove 84 in the collar, and at the same time the gear 85 is moved into mesh with the gear 86. Engagement of the end 69 of the sleeve 68 in the groove 84 retains the shaft 79 in elevated position. After the shaft 79 has been elevated to the position shown in Fig. III it is turned and through the gears 85 and 86, and the sleeve 68, the units numeral wheel is turned, this wheel being given a sufficient number of turns to return the numeral wheels of higher orders to zero through the transfer mechanism above described. After the trip register has been reset, the shaft 79 is lowered whereupon the spring 81 moves the sleeve 70 to normal position to again couple the sleeve 38 and the units registering wheel together for actuation by movement of the vehicle.

In the modification shown in Figs. VIII to XIII, the units registering wheel of the trip register comprises a numeral wheel 90 loosely mounted on a sleeve 91 fast on the sleeve 38. The right hand side portion of the wheel 90 is hollow and a disc 93 is secured to an annular shoulder 93′ in the hollow portion of the wheel. The right hand side of the disc 93 engages a shoulder 92 on the sleeve 91 to prevent axial movement of the units numeral wheel towards the right. Secured to the right hand end of the sleeve 38 and 91 is a disc 95 having V-shaped depressions 96 (Fig. IX) in its periphery. The right hand end of the rod 37 is supported in the sleeve 68 which at its left hand end has a radial flange 97, to which is fastened a disc 98 (Figs. VIII and XII), the disc 98 being mounted on a shoulder on the flange 97 and having two diametrically opposite projections 99 extending into a groove 100 in the left hand face of the flange 97 so that the disc and flange are coupled together. The disc 98 has two diametrically opposite laterally extending projections 102 (Figs. VIII to XII) at its periphery which are integral with the disc and provided with teeth 103 stamped out in any desired manner. The projections 102 extend through slots or openings in the disc 93 secured to the unit numeral wheel. Mounted on the rod 37 and between the disc 95 and the left hand end of the sleeve 68 is a spring member 105 (Figs. IX and XIII) comprising four spring arms 106 integral with a central ring portion 107 through which the rod 37 passes. The ring portion 107 bears against the end of the sleeve 68 and the arms 106, which normaly extend at an angle to the plane of the ring portion 107 bear against the disc 95, whereby the arms 106 tend to move the sleeve 68 towards the right.

In this modification it can be seen that when the shaft 79 is in elevated position, in which position it is adapted to turn the trip register to zero, the sleeve 68 has been moved to the left to the position shown in Fig. VIII and the teeth 103 are out of engagement with the notches 96 in the disc 95 fast on the sleeve 38 so that the turning of the shaft 79 rotates the registering wheels to zero without affecting movement of the sleeve 38 and the actuating mechanism, the units registering wheel being rotated through the gears 85 and 86, arms 102 and disc 93, while the wheels of higher order are rotated to zero by the units wheel through the transfer mechanism. When the shaft 79 is lowered to disengage the gears 85 and 86, the spring member 105 moves the sleeve 68 towards the right to normal position as the spring arms 106 move towards their normal position. In this normal position of the sleeve 68 the teeth 103 on the projections 102 of the disc 98 engage in notches 96 of the disc 95 fastened on the sleeve 38 and as the projections 102 remain in slots 103 of the disc 93 fast on the units registering wheel, it can be seen that the latter is coupled to the sleeve 38 for rotation by the actuating mechanism.

The modification shown in (Figs. XIV and XV) is somewhat similar to the modification just described and shown in (Fig. VIII), and therefore like reference numerals will be used to designate the corresponding parts as far as convenient. As in the modification above described, the projections 102 of the disc 98 project through slots in the plate 93 secured to the units numeral wheel. Mounted between the shoulder 94 of the units numeral wheel and the disc 93 is a ring 104 having integral spring leaf arms 108, which engage the end of the projections 102 of the disc 98 so that when the shaft 79 is lowered out of resetting position the spring arms 108 move the plate 98 and sleeve 68 towards the right to normal position to re-engage the teeth 103 on the arms 102 with the notches 96 in a flange 109 integral with the right hand end of the sleeve 38.

In the modification shown in (Figs. XVI, XVII and XVIII), the units numeral wheel comprises a numbered wheel 110 to the right hand side of which is attached a disc 111 having diametrically opposite, laterally extending projections 114 adjacent its periphery. Fast on the flange 97 of the sleeve 68 is a disc 115 having at its periphery two diametrically opposite, laterally extending projections 116. The end of each projection 116 is cut and then bent to form an inwardly extending tongue 118 and two outwardly extending tongues 119, there being one tongue 119 on each side of the tongue 118. A flange 120 integral with the right hand end of the sleeve 38 is provided with notches 121 into which inwardly extending tongues 118 of the projections 116 are adapted to engage. The projections 114 of the disc 111 carried by the units registering wheel project between the tongues 119 on the disc 115 so that the units wheel is turned with the sleeve 68 while the latter may have axial movement independently of the units wheel. Mounted between the flange 120 on the sleeve 38 and the sleeve 68 is a spring member 88 identical in construction to the spring member shown in (Fig. XIII). As can be seen from (Fig. XVI) when the resetting shaft 79 is in elevated resetting position the tongues 118 are out of alignment with the flange 120 on the sleeve 38 so that the register wheels may be turned to zero independently of the sleeve 38. When the resetting shaft is lowered the spring member 88 moves the sleeve 68 towards the right to normal position in which the tongues 118 are in engagement with the teeth of the flange 120 whereby the units registering wheel is coupled to the sleeve 38 for actuation by movement of the vehicle.

In the modification shown in (Figs. XIX, XX and XXI) the units registering wheel of the trip register comprises a wheel 125 having two diametrically opposite openings intermediate its center and periphery. Fast to the right hand side of the wheel 125 is a disc 127 having an offset radially extending flange 128. The right hand end of the rod 37 is supported in a sleeve 129 which carries on its right hand end a bevel gear 130 and is provided on its left hand end with a peripheral flange 131 to which is rigidly secured a disc 132 having its peripheral portion offset to form a radial flange 133 engaging the radial flange 128 of the disc 127 for the purpose of providing a chamber or space between the central portions of the two discs 127 and 132 in which is positioned a disc 134 fast on the right hand end of the sleeve 38. The peripheral flanges of the discs 127 and 132 are fastened together by rivets or other suitable means.

The disc 127 has holes 135 in alignment with the holes 126 in the wheel 125 and mounted in the holes 135 are balls 136 and between these balls and the transfer disc 46 are compressed springs 137, which normally retain the balls in such position that they partly project into holes 139 formed in the disc 134. There are ten holes 139 and the balls engage in the two holes which are in alignment with the balls at the end of a resetting operation. The resetting shaft 79 carries a bevel gear 140 which meshes with the bevel gear 130 on the sleeve 129 when the resetting shaft is in resetting position. When the shaft 79 is in its lowered position, the gears 130 and 140 are out of mesh and actuation of the sleeve 38 by movement of the vehicle operates the registering wheels. During rotation of the sleeve 38 and the disc 134 the units numeral wheel is operated as the balls 136 form connecting means between the disc 127 and the disc 134 since the balls 136 are located in the holes in the disc 127 and project into the aligned holes 139 in the disc 134, the springs being sufficiently compressed to prevent the balls 136 from being moved out of the holes 139 during such actuation of the units numeral wheel. As the sleeve 129 is fastened to the units wheel, the sleeve and gear 130 are actuated at the same time. When the resetting shaft 79 is elevated to resetting position, the gear 140 meshes with the gear 130 so that upon rotation of the shaft 79, the sleeve 129 and hence the units numeral wheel is rotated to reset the registering wheels of the trip register to zero. During such movement of the unit registering wheel, the sleeve 38 and disc 134 are held stationary by the co-operation of the transfer pinion 66 with the disc 63 and gear 55 (Fig. III), and hence the balls 135 are forced out of the openings 139 in the plate 134 during this relative movement between the units registering wheel and the disc 134. A leaf spring 143 secured to the casing 78 has its lower end formed to engage the lower side of the gear 140 when the resetting shaft 79 is in resetting position for the purpose of resiliently retaining the shaft in such position. During elevation of the shaft the outwardly turned lower end of the spring 143 engages the gear teeth of the gear 140 to move the end of the spring out of the path of the gear until the gear is in elevated position when the spring assumes the position shown in (Fig. XIX.)

In the modification shown in (Figs. XXII, XXIII and XXIV) the units numeral wheel comprises a wheel 145 to the right hand side of which is secured a disc 146 and to the left side a disc 147. The disc 145 is provided with two diametrically opposite holes 148 and the discs 146 and 147 are provided with holes in alignment with the holes 148. Projecting through the holes 148 and the corresponding holes in the discs 146 and 147 are pins 149 on which are enlarged portions 150 projecting through the holes in the disc 146. Springs 153 are mounted in the holes 148 and are compressed between the portion 150 and the disc 147. The right hand ends of the pins 149 are securely fastened to a disc 154 mounted on a sleeve 155 supporting the right hand end of the rod 37.

Mounted on the sleeve 155 is a gear 156 which is adapted to mesh with a gear 157 fast on the resetting shaft 79. The sleeve 155 has a conical end 158, which is adapted to co-operate with a collar 159 on the resetting shaft in the same manner as the end of the sleeve 68 shown in (Fig. III) co-operates with the collar 82. Fast on the right hand end of the sleeve 38 and adjacent to the disc 147 is a disc 160 having ten holes 162. The disc 160 has a notch 163 in its periphery for co-operating with corresponding transfer pinion 66 (Fig. II) as is well known in the art.

It will be seen that when the shaft 79 is in resetting position, as shown in (Fig. XXII) turning of the shaft 79 rotates the units numeral wheel through the gears 156 and 157, the sleeve 155, the disc 154 and the pins 149. The left hand ends of the pins 149 being out of engagement with the holes 162 in the disc 160 fast on the sleeve 38 the units wheel is rotated independently of the disc 160. When the resetting shaft 79 is lowered to normal position the collar 159 through its co-operation with the conical end of the sleeve 158 shifts the sleeve 155 towards the left whereupon the pins 149 are moved towards the left against the action of the springs 153 so that the left hand ends of the pins project through the openings 162 which happen to be in alignment when the pins are shifted. Hence, when the sleeve 38 and disc 160 are rotated during movement of the vehicle, the unit numeral wheel as well as the sleeve 155 are rotated therewith through the pins 149.

It is obvious that when the resetting shaft 79 is elevated to resetting position that the collar 159 is moved out of engagement with the end of the sleeve 155 and that the springs 153 move the pins 149, the disc 154 and sleeve 155 towards the right to the position shown in Fig. XXII so that the ends of the pins 149 are moved out of the holes in the disc 160 and the gear 156 is moved into position to be engaged with the gear 157. When the shaft 79 is in its lowered position the end 158 of the sleeve 155 engages in the groove in the collar 159 to retain the sleeve 155 in normal position and when the shaft 79 is elevated the leaf spring 143 resiliently retains it in elevated position.

While I have described this invention in more or less detail and as being embodied in certain forms, it is not desired or intended to be limited thereto, but on the contrary, the invention contemplates broadly all proper changes in form, construction, and arrangement of parts as well as the omission of immaterial parts or elements, and the substitution of elements therefor as circumstances may suggest, or necessity render expedient.

Having thus described my invention, what I claim as new and desire to secure by Letters Patent, is:

1. In an odometer, the combination of a plurality of registering wheels, an actuating sleeve upon which said wheels are mounted, resetting means for turning the wheels to zero without effecting movement of the actuating sleeve, and coupling means mounted axially of said sleeve and movable in one direction to positively couple the wheels to said sleeve and movable in the other direction to positively couple said resetting means to the wheels.

2. In an odometer, the combination of a plurality of registering wheels, an actuating sleeve upon which said wheels are mounted, resetting means for turning the wheels to zero without effecting movement of the actuating sleeve, and coupling means in axial alignment with said sleeve movable in one direction to positively couple the wheels to said sleeve and movable in the other direction to positively couple said resetting means to the wheels, and spring means for moving the coupling means in one of said directions the coupling means being moved positively in the opposite direction.

3. In an odometer the combination of a rod, an actuating sleeve mounted on said rod, a plurality of registering wheels mounted on said sleeve, coupling means slidably mounted on said rod for coupling the sleeve and units wheel together, and resetting means for sliding said coupling means on said rod in one direction to disconnect the coupling means from said sleeve.

4. In an odometer, the combination of a registering wheel having a central sleeve portion provided with grooves, an actuating sleeve provided with a flange having notches, a member mounted axially of said sleeve, and having an enlarged portion with projections normally engaging in said grooves and said notches to couple the wheel and actuating sleeve together, and resetting means for first moving said member to disengage the projections from said notches and then rotating the member to turn the wheel to zero.

5. In an odometer, a registering wheel, an actuating member therefor, a sleeve for normally coupling the actuating member and registering wheel together, a gear on said sleeve, a resetting shaft, means on said shaft for shifting the sleeve axially of the wheel to disconnect the sleeve from the actuating member and a gear on said shaft adapted to mesh with said gear on the sleeve, when said sleeve is disconnected from said actuating member.

6. In an odometer, a registering wheel, an actuating member, a sleeve for normally coupling said actuating member and wheel together, a gear on said sleeve, an axially movable resetting shaft, means on said shaft for shifting said sleeve to disconnect the latter from the actuating member when the shaft is moved to resetting position, the sleeve being adapted to co-operate with said means to retain the shaft in resetting position, a gear on said shaft engaging the gear on the sleeve when the shaft is in resetting position, and a spring for moving the sleeve to normal position when the shaft is moved out of resetting position.

7. In a device of the class described, the combination of a shaft, a hollow registering wheel mounted thereon, a member mounted concentrically of said shaft and slidable axially thereof, said member having means located within said wheel for rotatably engaging said wheel when in one position and for coupling said shaft and said wheel when slid to another position, and means operative to rotate said member only when the latter is in a position to rotate said wheel.

In testimony whereof I affix my signature.

ERNEST R. HUNTLEY.